United States Patent [19]

Williamson et al.

[11] Patent Number: 4,635,188

[45] Date of Patent: Jan. 6, 1987

[54] MEANS FOR FAST INSTRUCTION DECODING FOR A COMPUTER

[75] Inventors: Donald A. Williamson, Cupertino; John F. Shelton, Aptos, both of Calif.

[73] Assignee: Hewlett-Packard Company, Palo Alto, Calif.

[21] Appl. No.: 518,609

[22] Filed: Jul. 29, 1983

[51] Int. Cl.⁴ .............................................. G06F 9/22
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,875,391 | 4/1975 | Shapiro et al. | 364/200 |
| 4,010,448 | 3/1977 | Bennett et al. | 364/200 |
| 4,354,228 | 10/1982 | Moore et al. | 364/200 |
| 4,394,736 | 7/1983 | Bernstein et al. | 364/200 |
| 4,450,519 | 5/1984 | Guttag et al. | 364/200 |

Primary Examiner—David Y. Eng
Attorney, Agent, or Firm—Edward Y. Wong

[57] ABSTRACT

A scheme for improving the decoding time of macroinstruction opcodes in a programmed computer is provided. By having a direct Instruction Jump Table responding to macroinstructions and a pipelined Address Jump Table responding to the same macroinstructions simultaneously, larger sequences of microinstructions are decoded in a minimum number of microcycles, thus resulting in a faster operating programmed computer.

5 Claims, 3 Drawing Figures

MEANS FOR FAST INSTRUCTION DECODING FOR A COMPUTER

BACKGROUND OF THE INVENTION

In a microprogrammed computer, sequences of microinstructions are used to emulate higher level macroinstructions. After a macroinstruction is fetched, some technique must be used to vector the computer to the microaddress where the microinstruction sequence for that macroinstruction starts. Once vectored, the microinstruction sequence can then be accessed and executed.

This function of vectoring the computer to the microinstruction sequence is generally performed via a jump table PROM in the prior art. When such is the case, part or all of the macroinstruction opcode is used to address the jump table. The data stored in the PROM at the address location corresponding to the opcode is then used as the address of the first microinstruction of the emulation code.

For many systems in the prior art, it takes one or more microcycles to generate the microaddress once the macroinstruction opcode is available, and it takes still another microcycle to read the microinstruction from control store after the microaddress is available. Thus there is a minimum of two microcycles from the time that a macroinstruction is available to the time that the first microinstruction of the emulation sequence is available. Furthermore, due to limitations in PROM size and density, hitherto it has never been feasible to decode an entire 16-bit macroinstruction opcode in one microcycle. To overcome this limitation, additional decoding is often done using vectored jumps in microcode, or additional levels of jump tables. Thus, part of the macroinstruction opcode is vectored to one microinstruction sequence during one cycle, and another part is vectored to another microinstruction sequence in another cycle. In short, multiple microcycles are needed to complete a decoding process in the prior art. FIG. 1, depicting a typical prior art vectoring scheme, clearly shows that the fetching and accessing of a microinstruction sequence for execution necessitate a minimum of two microcycles.

SUMMARY OF THE INVENTION

In accordance with the preferred embodiment of the invention, the prior art jump table of microaddresses is replaced with an instruction jump table (IJT). The IJT takes part or all of a macroinstruction opcode as input and produces an entire microinstruction as its output. This can typically be done in the same length of time that it takes a prior art jump table to produce a microaddress, which is only an intermediary to the required microinstruction. In effect, the microcycle spent reading the microinstruction from control store in the prior art is eliminated in the preferred embodiment of the invention.

If it is impractical to decode the entire macroinstruction opcode in the IJT, an Address Jump Table (AJT) can also be used. There, the AJT functions very similarly to the prior art jump table. It takes part or all of the macroinstruction and produces a microaddress. However, this microaddress, contrary to the prior art, is available simultaneously with a microinstruction from the IJT. Therefore, during the cycle in which the microinstruction from the IJT is being executed, the address from the AJT can be used to read the ensuing microinstruction from control store. The end result is that there is a minimum amount of delay from when the macroinstruction is available to when the first emulation microinstruction starts. The first emulation instruction is chosen by the IJT and the second can be chosen by the AJT, thus resulting in two levels of decoding with no additional overhead over that of the prior art.

DETAILED DESCRIPTION

Figure 1:
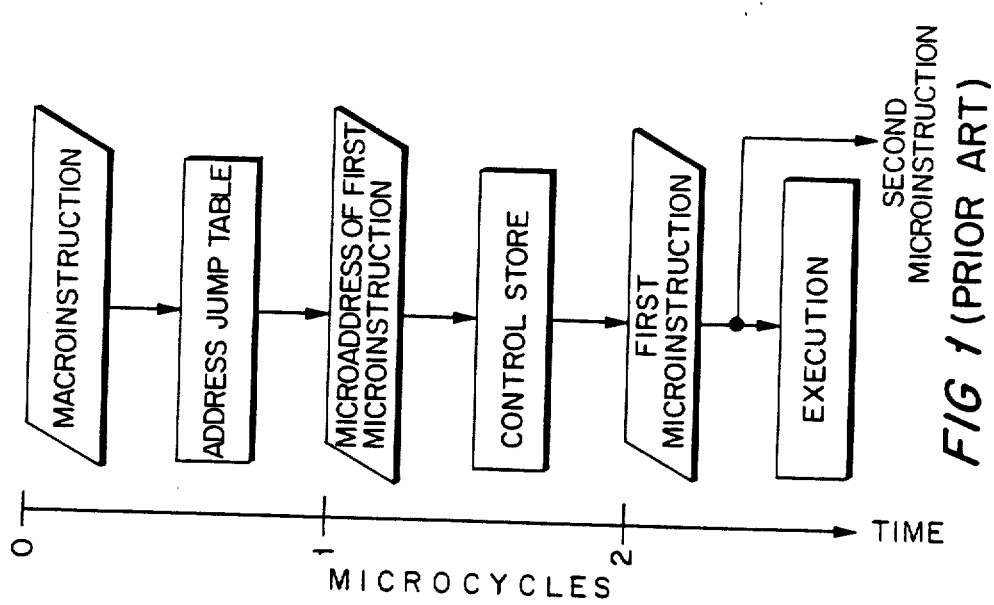
FIG. 1 shows a timing sequence in the prior art decoding scheme.
Figure 2:
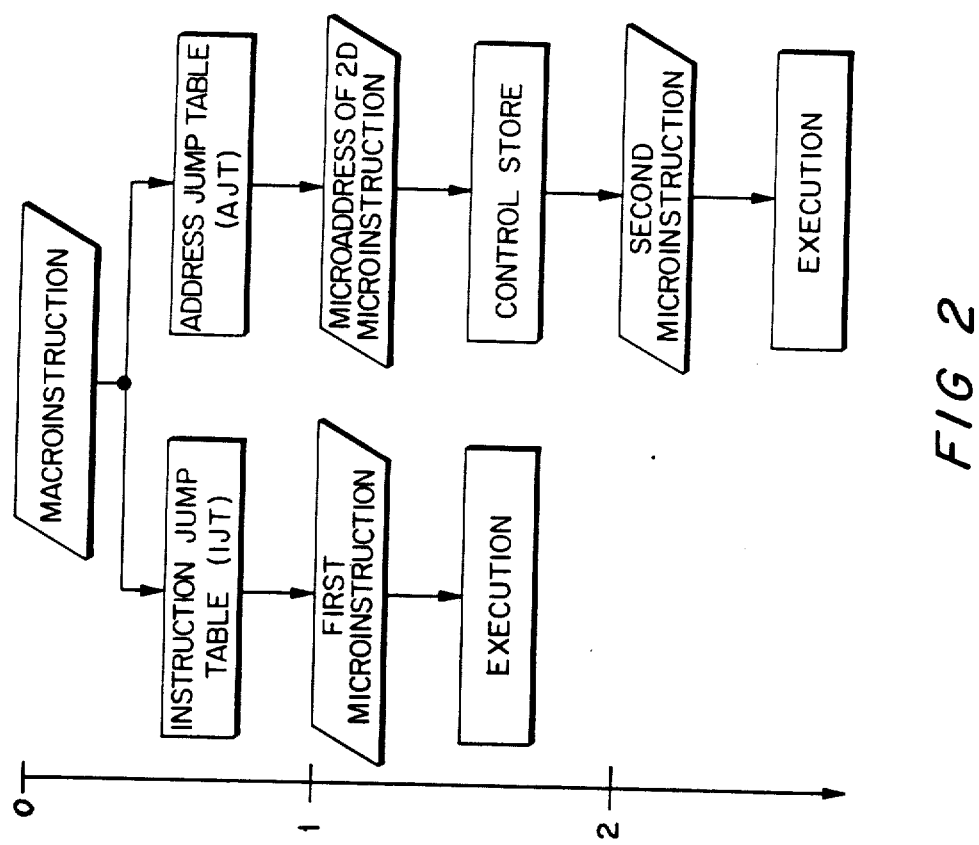
FIG. 2 shows a timing sequence in accordance with the invention.
Figure 3:
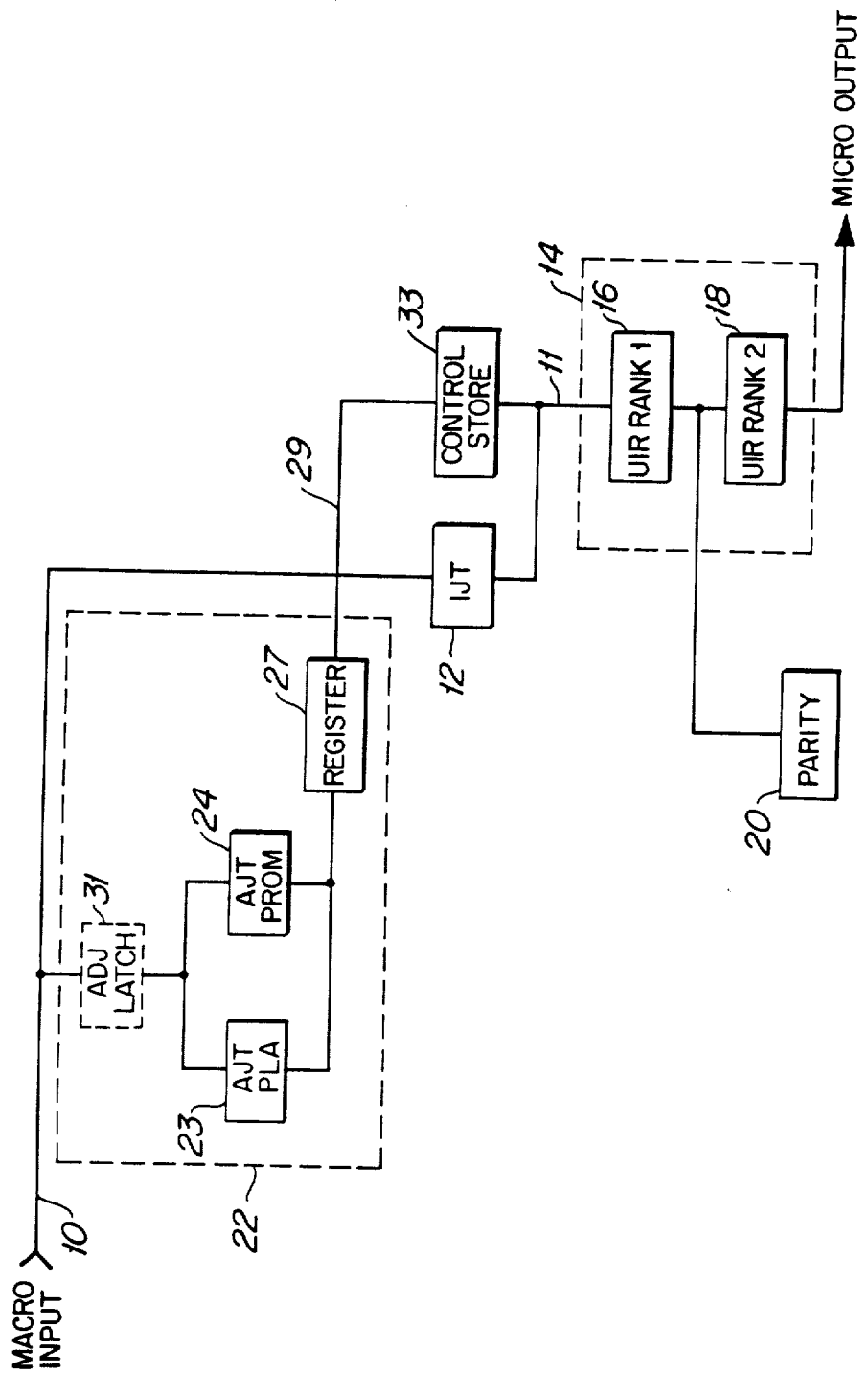
FIG. 3 depicts a block diagram of the preferred embodiment of the invention.

In a given microcycle, line bits 7–15 of a macroinstruction opcode coming from a cache via an input bus 10 are sent to an Instruction Jump Table (IJT) 12. This IJT 12 produces, for example in the illustrated embodiment of FIG. 3, a 48-bit microinstruction based on the input line bits. At the end of the microcycle, this microinstruction is loaded into a microinstruction register 14, the UIR, and becomes the first line of a microcode used in emulating a new macroinstruction.

The UIR 14 has two ranks 16, 18. The first rank 16 holds the entire microinstruction; it controls operations which are completed in the present microcycle. At the end of the microcycle, some of the fields from the first rank 16 are then transferred to the second rank 18. These fields control the operations which are to be completed in the following microcycle. In the illustrated embodiment, further circuitry 20 is available to check the UIR outputs to assure that these outputs have odd parity.

At the same time that line bits 7–15 are sent to the IJT 12, all 16 bits of the macroinstruction coming from the cache during the microcycle are sent to an Address Jump Table (AJT) 22. The 15-bit address which is produced by the AJT 22 in response to the input line bits is loaded into a AJT register 27 at the end of the microcycle. If there are no interrupt commands pending in the microcycle, the AJT register 27 will be selected as the microaddress during the microcycle following the present one. In the illustrated embodiment, the AJT 22 further outputs a 16th bit to indicate whether or not the instruction from the IJT 12 should actually be executed. Thus, the first emulation microinstruction which came from the IJT 12 can be ignored and the second emulation microinstruction can come from the address generated by the AJT 22.

In operation, the IJT in the illustrated embodiment looks at only the upper 9 bits of the macroinstruction on the input bus 10, that is, line bits 7–15. It then generates a 48-bit microinstruction word. At the proper command, this microinstruction is enabled onto an output bus 11 and is loaded into the UIR 14 at the end of the microcycle. It therefore becomes the first line of the emulation code for the current macroinstruction.

Operation of the AJT 22 parallels that of the IJT 12. The AJT 22 must look at a macroinstruction on the input bus 10 and generate, for example, a 15-bit address which will be used in the following microcycle to generate the second emulation microinstruction for the current macroinstruction. However, due to (1) the level of decoding needed and (2) certain timing constraints, the AJT 22 is more complex than the IJT 12.

In accordance with the preferred embodiment, two types of decoding are used in the AJT 22. First, a programmable logic array (PLA) 23 looks at all 16 macroinstruction line bits. The PLA 23 has terms which in effect allows the entire instruction set to be split into different groups. This technique distinguishes base set instructions well and vectors input/output instructions efficiently. Any group of instructions not handled by the PLA 23 is handled by programmable read-only-memories (PROMs) 24. In the illustrated embodiment the PLA 23 generates only seven bits of the address, and the PROM 24 generates a full 15-bit address. The PROM 24 can therefore point anywhere in a control store 33. Both the PLA 23 and the PROM 24 generate low true addresses.

If timing allows, the address from the AJT 22 is clocked into a register 27 at the end of each microcycle and at the proper command. The output of the register 27 is then enabled onto an address bus 29 in the following cycle. However, in the illustrated embodiment the data on the input bus 10 arrives late enough that the output of the AJT 22 is not valid at the end of the cycle, thus requiring that some other technique be used. In lieu of a microinstruction register 27, a transparent latch 31 is placed between the input bus 10 and AJT 22, and the AJT outputs are enabled directly into the control store 33 via the address bus 29. Thus, some of the "dead time" at the beginning of the following microcycle can be used. In this case, the latch 31 is opened upon a command during an initial microcycle. Therefore, the data will start propagating through the AJT 22 as soon as it is available on the input bus 10. At the end of the microcycle the latch 31 will close, but the data will continue to propagate to the AJT output which will become valid before it is needed in the following microcycle. With this scheme, the appropriate half of the AJT 22 is enabled in the following microcycle. Neither half will be enabled if a signal indicating an unmasked interrupt or a single step is present in the beginning microcycle.

Upon receiving the AJT outputs, the control store 33 generates a 48-bit microinstruction word. At the proper time, this microinstruction is enabled onto the output bus 11 and is loaded into the UIR 14 at the end of the microcycle. It therefore becomes the second line of the emulation code of the current macroinstruction.

Since decoding by the IJT 12 line is less complete than that by the AJT 22, that is, since the IJT 12 uses 9 bits of input instead of 16 bits, the AJT 22 serves one more function. By decoding only 9 bits, the IJT 12 in effect is approximating a microinstruction which is useful as the first emulation line of many macroinstructions. However, for some macroinstructions this line may be actually conflicting with AJT-generate microinstructions. For this reason, the AJT 22 generates a signal which can inhibit any stores or memory operations indicated by the IJT 12 microinstruction. This inhibit signal is asserted by the AJT PLA 23 and PROM 24 for unrecognized instructions, and by the AJT PROM 24 when the IJT 12 approximates an instruction incorrectly.

We claim:

1. An apparatus for fast instruction decoding in a computer comprising:
   a means for accessing a plurality of decoding means in response to a macroinstruction opcode;
   a first decoding means being accessed by said accessing means for providing a first level emulation instruction for execution in response to said macroinstruction opcode;
   a second decoding means being accessed simultaneously with the first decoding means by said accessing means for providing a microaddress code in response to said macroinstruction opcode; and
   a third decoding means for providing a second level emulation instruction for execution in response to said microaddress code.

2. The apparatus as in claim 1 wherein said first and second decoding means operate in a first instruction cycle and said third decoding means operates in the next cycle immediately following said first cycle.

3. The apparatus as in claim 2 wherein said third decoding means is a control storage device.

4. The apparatus as in claim 2 wherein said second decoding means has a latch device as an input port for said macroinstruction opcode.

5. The apparatus as in claim 2 wherein said second decoding means has a register device as an output port for said microaddress code.

* * * * *